United States Patent Office 3,362,887
Patented Jan. 9, 1968

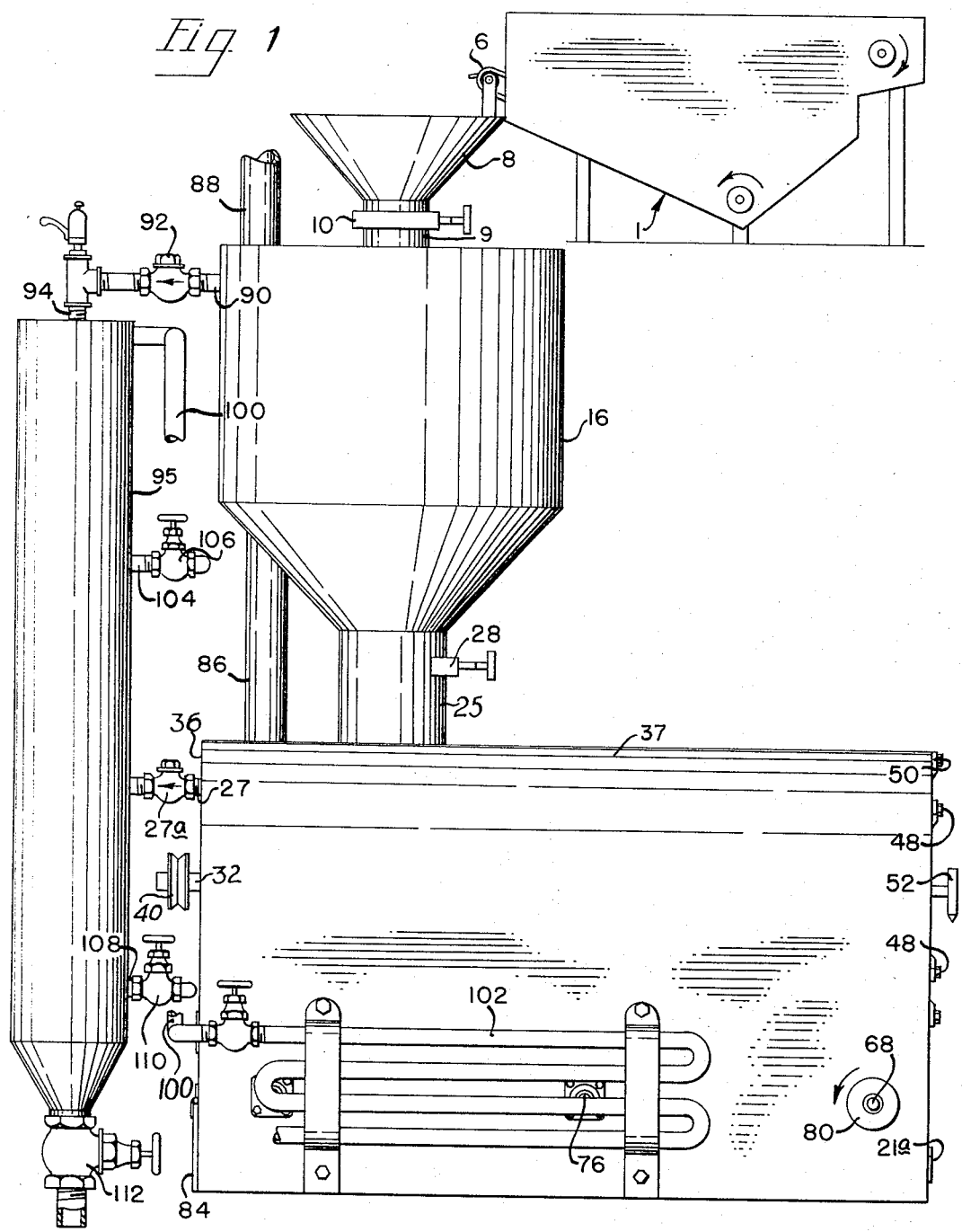

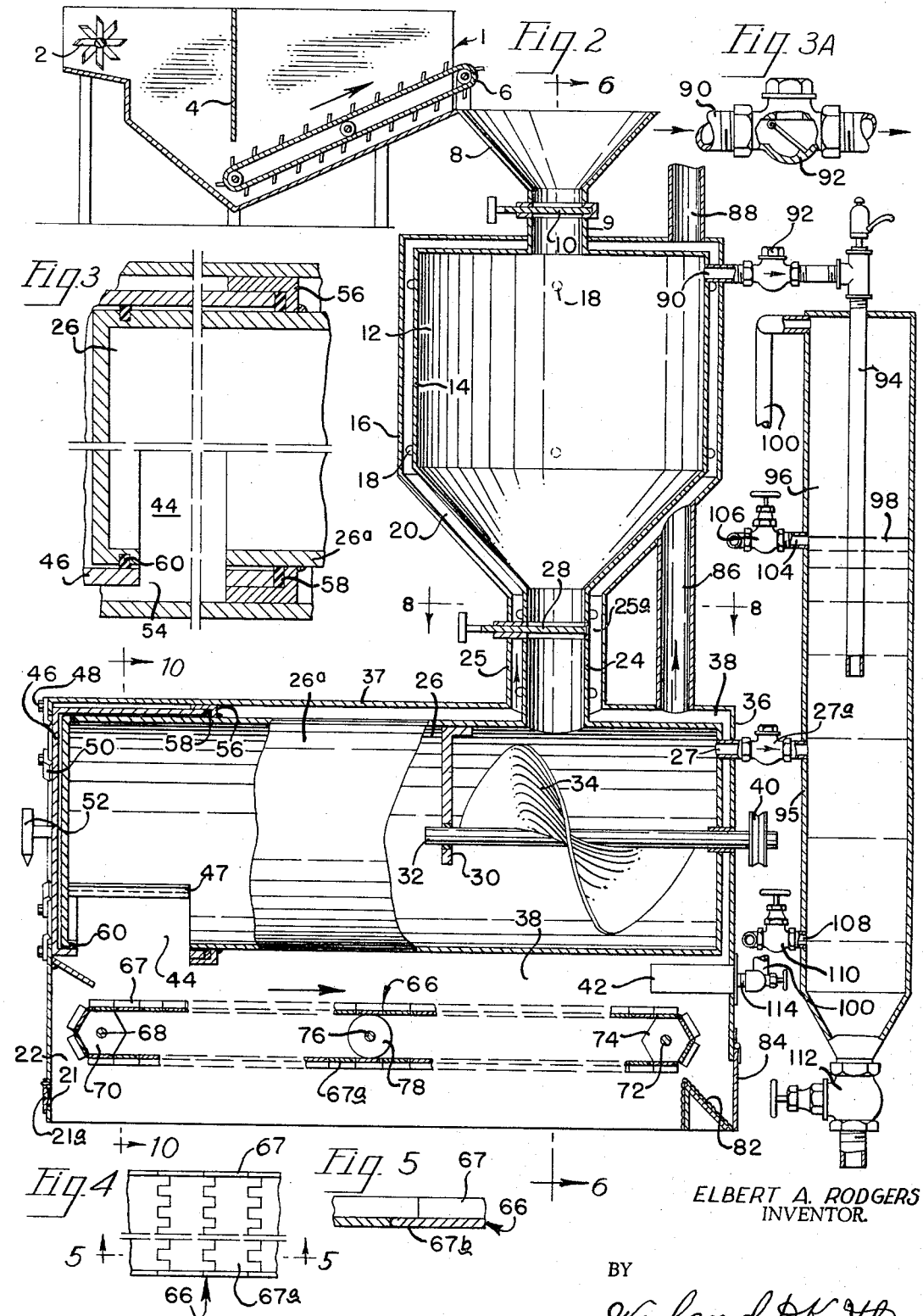

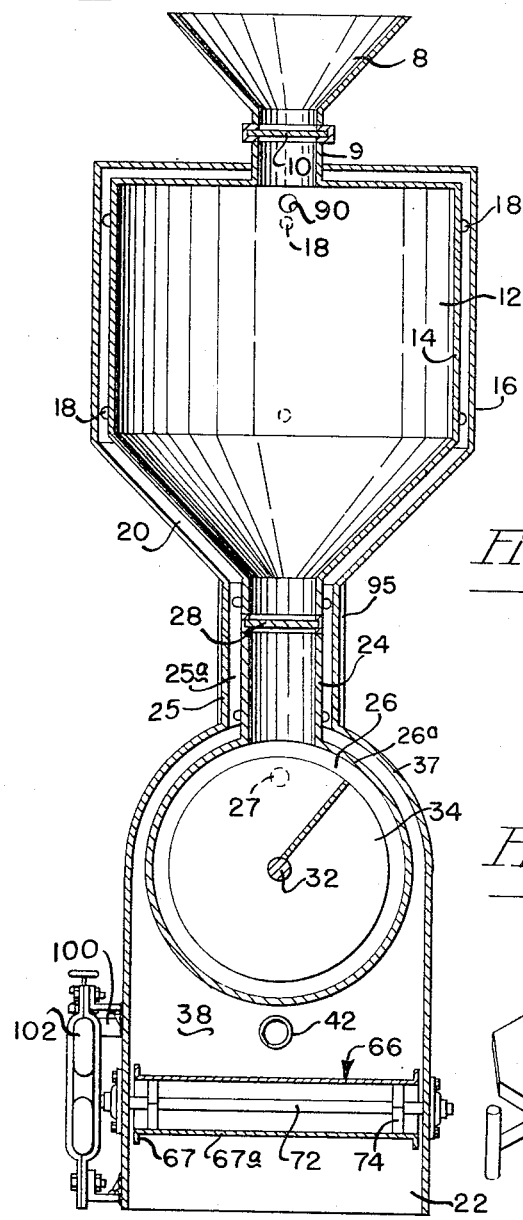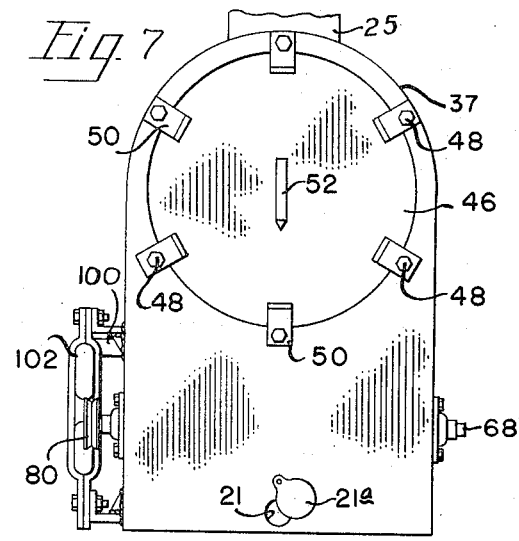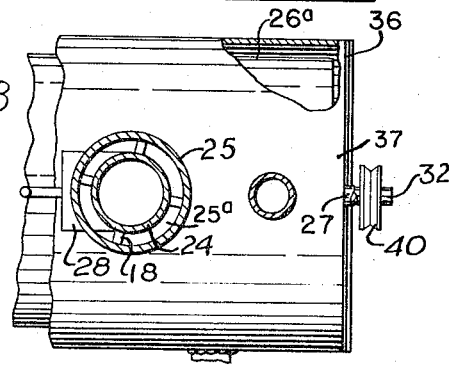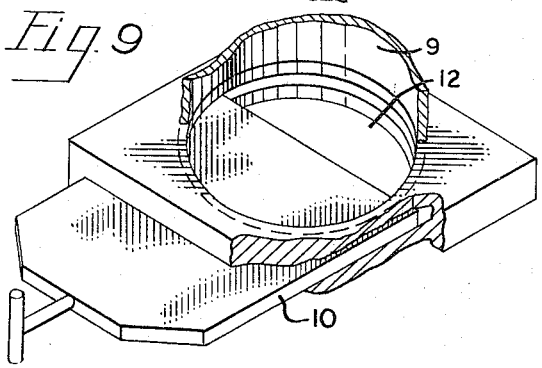

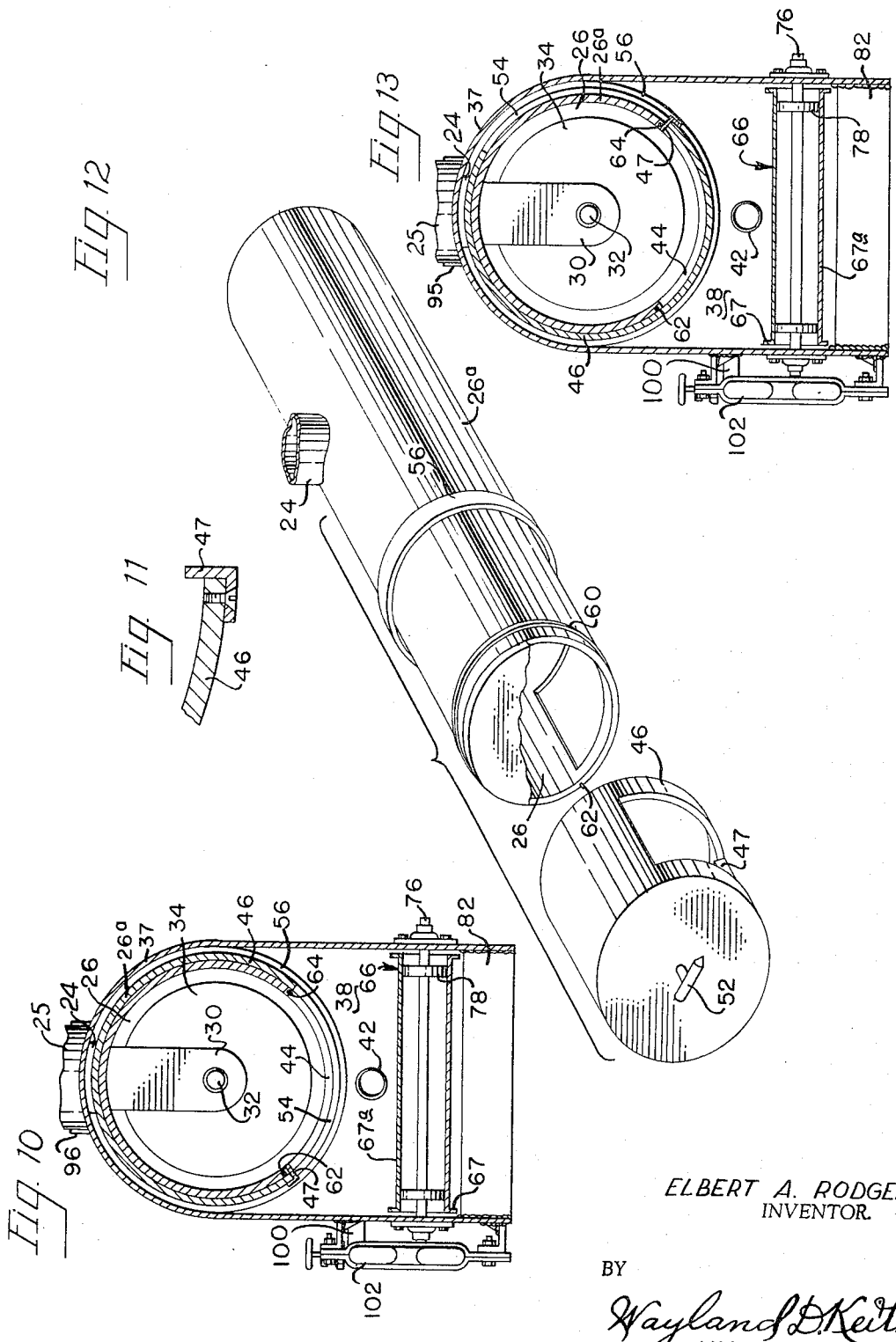

3,362,887
APPARATUS FOR AND METHOD OF REDUCING REFUSE, GARBAGE AND THE LIKE TO USABLE CONSTITUENTS
Elbert A. Rodgers, 4520 Spencer,
Wichita Falls, Tex. 76308
Filed May 8, 1964, Ser. No. 365,982
7 Claims. (Cl. 201—21)

ABSTRACT OF THE DISCLOSURE

An apparatus for, and method of treating refuse, other waste materials to recover valuable materials therefrom. A batch of refuse is shredded and conveyed into a first chamber and the batch is heat treated to recover gases therefrom, with the batch directed into a second chamber for heat treating to recover further gases therefrom, with the single source of heat, treating a second batch in the first chamber simultaneously with the treating the first batch in the second chamber. The refuse is directed from the second chamber onto a conveyor having flat sections where the refuse is further treated to carbonize by the single source of heat, that is used to treat a batch in each first and second chambers. Provision is made to further condense gases and also to convey the carbonized refuse out of the heat treating zone.

---

This invention relates to improvements in an apparatus for and a method of reducing refuse, garbage, and offal containing vegetable or animal matter and certain forms of minerals into usable gases and solids, in such manner as to render these less obnoxious in odor and to handle.

Various attempts have been made to produce an apparatus for handling the above mentioned materials in large quantities, such as the materials received by city sanitation and disposal departments, however, cities for the most part incinerate or bury the material in land fills and the like. However, upon incinerating the material either under self combustion or by being fired by artificial or natural gas or other fuel, the odor emitted from the products of combustion is offensive to the point of near intolerability.

Other cities have experimented with land fills for almost a hundred years and this contaminates the land for most commercial purposes, and if the land fill is made in deep trenches in porous soils, the encroachment of water thereinto and the subsequent drainage of water into usable water strata contaminates the water strata to such an extent that it is dangerous to use. Furthermore, land fills tend to maintain the fecal matter and vegetable matter in a state of decomposition without permitting the matter to dry out or to become absorbable into the earth as soil and emits gases which find their way to the surface, thereby attracting insects, bacteria, and germs and renders land of this character practically useless for decades.

The present invention is designed to correct the defects usually present in the methods of disposal of garbage, refuse, offal, and all vegetable and mineral matter, such as is accumulated by cities for disposal in the interest of health, sanitation, and safety of the inhabitants.

The present apparatus is so constructed as to enable the above mentioned refuse, which includes the various above enumerated categories, to be processed through this apparatus without prior assorting, selecting, or otherwise processing, thereby enabling all materials, whether destructible or not, to be passed through this apparatus and processed, with the gases being taken off in the form of usable artificial gas for heating and the like, processing the vegetable and animal matter and certain minerals into a product suitable for use in furnaces and the like, and with the metallic and incombustible matter being processed in such manner that they can be assorted for disposal, by the ton, to salvage or junk yards. Furthermore, certain of the gases are condensed and the residual liquid therefrom used in the preparation of pharmaceutical products, tanning industry, insecticide bases, and various other chemical products, depending upon the material processed. For instance, if a large amount of waste wood, such as pine, is processed, a turpentine creosote will be produced in liquid form, a gas will be produced which is suitable for combustion purposes and charcoal will be produced suitable for use in foundries or for general use.

When materials such as wood products, animal carcasses, paper, and a general conglomeration of debris and materials is processed through the present apparatus the material will yield a gas suitable for combustion, a liquid residual constituent, condensed from the gas, which carries many valuable chemicals, when re-processed through a secondary refinery, and furthermore the end materials may be used in the form of charcoal, soda ash, or the like, depending on the temperature at which the material is treated, then after the materials are discharged, metals and non-distillable minerals may be removed from the charcoal by conventional means such as magnetic separators, screen grates, and the like, as is well known in the art, therefore it is not considered necessary to illustrate these as no claim is being made on the magnetic separators, screen grates, and the like.

The products manufactured by processing the above mentioned waste materials through the apparatus should normally sell for a sufficient sum to pay all costs of collecting and processing the waste materials, and furthermore, the sale of the products should show a profit, thereby enabling a city sanitation system to be financially self sufficient.

While all materials can be used without selective sorting and without the residual products being re-refined, the materials may also be pre-selectively sorted, to obtain materials of the same general character and the various grades of materials to be processed in separate apparatus so as to convert the material into various products which will require little or no re-refining, as for instance woody materials convert readily into charcoal, gas, and liquids, whereas offal convert readily onto grease, tankage, etc.

An object of this invention is to provide a method of reducing refuse, waste, and offal to usable components in the form of gases, liquids, and solids so as to enable waste and refuse collection and disposal to be a self-sufficient operation.

Another object of the invention is to provide an apparatus for reducing waste materials, refuse, and offal into usable components whereby the gases emitted from the materials will normally furnish sufficient gas for combustion thereof and even at times provide surplus gas for sale.

Still another object of the invention is to provide a garbage and waste reduction system whereby large amounts of waste materials are handled mechanically from the time the garbage and waste material, etc. enters the device until each of the components thereof is discharged from the process chamber.

Still another object of the invention is to provide a unit for processing refuse material and the like whereby noxious odors are maintained at a minimum.

Yet another object of the invention is to provide a device for reducing waste, refuse, and the like into compact component parts, which device may be set up in a minimum of time or moved in a minimum of time, and which device is simple in construction, easy to operate, low in the cost of manufacture, and low in the cost of operation.

With these objects in mind and others which will become manifest as the description proceeds, reference is to be had to the accompanying drawings in which like reference characters designate like parts in the several views thereof, in which:

FIG. 1 is an elevational view of the processing plant to reduce waste, refuse, garbage, offal and the like into usable components;

FIG. 2 is a vertical, sectional view, looking in the opposite direction from that shown in FIG. 1, of the processing unit, with parts being broken away and parts being shown in full outline to bring out the details of construction;

FIG. 3 is an enlarged fragmentary, sectional view taken through the end of the processing chamber and showing the sealing gaskets therein, with parts being broken away and parts being shortened to bring out of the details of construction;

FIG. 3A is an enlarged elevational view of a check valve with parts broken away and shown in section to show the details of construction;

FIG. 4 is a top plan view of a portion of the conveyer chain with parts broken away and shortened to bring out the details of construction;

FIG. 5 is a sectional view taken on line 5—5 of FIG. 4, looking in the direction indicated by the arrows;

FIG. 6 is a sectional view taken on line 6—6 of FIG. 2, looking in the direction indicated by the arrows;

FIG. 7 is a fragmentary end elevational view of a portion of the apparatus;

FIG. 8 is a sectional view taken on line 8—8 of FIG. 2, looking in the direction indicated by the arrows;

FIG. 9 is an enlarged fragmentary view of one of the valve gate mechanisms, with parts broken away and with parts shown in section to bring out the details of construction;

FIG. 10 is a sectional view taken on line 10—10 of FIG. 2, looking in the direction indicated by the arrows;

FIG. 11 is an enlarged fragmentary view showing the end of a closure door of the apparatus as shown in FIG. 10;

FIG. 12 is a perspective view of a removable cylinder member and the cap therefor, shown in exploded relation, with parts broken away and shown in section to bring out the details of construction of the removable cylindrical member; and FIG. 13 is a sectional view substantially like FIG. 10, but showing the door thereof in closed position.

With more detailed reference to the drawings, the numeral 1 designates generally a refuse receiving bin which has a shredder 2 near the receiving end so as to disintegrate the refuse, garbage, offal, and the like into relatively small component parts so as to enable the material to be more readily processed. The bin 1 is divided into two compartments by a partition 4. A conveyer 6 is mounted in the bin 1 along the lower side thereof to discharge material from the lower part of the bin upward and into a hopper 8.

A conduit 9 on the lower end of hopper 8 has a control gate 10 slidably mounted therein transversely thereof so as to regulate or cut off the flow of material from hopper 8 into a chamber 12, which chamber is formed by a cylindrical member 14. A further cylindrical member 16, which is complementary in shape to cylindrical member 14, surrounds cylindrical member 14 and is spaced therefrom to form an upper housing and is maintained in spaced apart relation therefrom by bars 18 interposed between cylindrical member 14 and cylindrical member 16 to provide a passageway for heated products of combustion from a furnace 22, as will be more fully brought out hereinafter.

The chamber 12 of cylindrical member 14 has a conical lower end with a downwardly extending pipe 24 which connects the lower end of cylindrical member 14 with a cylindrical member 26a, which forms a processing chamber 26, thereby enabling the material unloaded into bin 1 to be directed by conveyer 6 into hopper 8 and down through cylindrical member 14 and pipe or conduit 24 into the cylindrical processing chamber 26. A further slide gate 28 is provided in pipe 24 to regulate the flow of material from cylindrical member 14 into the cylindrical processing chamber 26.

The cylindrical member 26a has a support member 30 extending downward from the upper side thereof, in which cylindrical processing chamber 26 a shaft 32 of screw conveyer 34 is rotatably mounted. The shaft 32 extends outward through the cylindrical processing chamber 26 and through an end 36 of furnace chamber housing 37 which surrounds the cylindrical processing chamber 26 and confines the heat and products of combustion therearound, within the lower housing 37, as shown in FIGS. 2, 6, 10 and 13. A transmission wheel 40 is mounted on and secured to shaft 32 so as to enable the rotation of shaft 32 by suitable power means. The cylindrical member 26a is preferably supported a spaced distance from furnace chamber 38 on at least three sides thereof so as to enable heat from the burner 42 to travel upward between the furnace chamber 38 and the cylindrical member 26a. The cylindrical processing chamber 26 has an opening 44 in the lower side thereof at the end opposite from downwardly extending pipe 24.

A parti-cylindrical cap 46 surrounds the end of cylindrical member 26a in which opening 44 is formed, which cap 46 which forms a closure member for opening 44, which cap may be rotated upon loosening of bolts 48, which loosen clamps 50 to enable the cap 46 to be rotated through an arc, either to open opening 44 or to close the opening 44. A handle 52, which preferably has a pointer thereon, is attached to the end of cap 46 to indicate the particular relation of an opening 54 in the cap 46 with respect to opening 44 in the cylindrical member 26a. In this manner the cap 46 may be readily rotated from the outside of the furnace chamber 38 to determine the loading position and the unloading position of the material into and out of the cylindrical processing chamber 26. An angle 56 is secured to the periphery of cylindrical member 26a a spaced distance from the discharge end, which angle is in overlapping relation with the cap 46 so as to receive a gasket 58 therein so as to form a substantially fluid tight seal between the cylindrical processing chamber 26 and the cap 46, and when the opening 54 is not in register with the opening 44, the seal is effective against passage of low pressure gases. A seal 60 is provided on the opposite side of openings 44 and 54 from gasket 58 and provides a circumferential seal around the periphery of the cylindrical processing chamber 26. Longitudinal sealing strips 62 and 64 are positioned on each side of the opening 44 so as to form an air tight seal with cylindrical processing chamber 26 when the cap 46 is in closed position.

The parti-cylindrical cap 46 has a longitudinal angle member 47 secured along one longitudinal side of the opening 54, which angle member 47 extends into opening 44 so as to limit the arcuate movement of cap 46, and which angle member 47 abuts with longitudinal sealing strip 64 when in closed position and abuts with longitudinal sealing strip 62 when the cap 46 is in open position.

By loosening bolts 48, clamps 50 will be loosened, which will enable the rotation of the cap 46, where, upon tightening the bolts 48, clamps 50 will bindingly engage the inner end of parti-cylindrical cap 46 with gasket 58. A third conveyer, 66 which utilizes a chain, is provided within the furnace chamber 38 below the cylindrical processing chamber 26 and has one end portion thereof in position to receive material discharged out through openings 44 and 54, in cylindrical member 26a and parti-cylindrical cap 46. A shaft 68 supports a conveyer wheel 70 at one end of furnace 22 and a shaft 72 supports a conveyer wheel 74 at the opposite end thereof. A shaft 76 has an idler pulley 78 thereon, which shaft is positioned on bearings mounted on the walls of furnace 22, so as to be intermediate shafts 68 and 72 and which shaft is parallel therewith so that the idler pulley 78 will support the conveyer chain 66. A drive pulley 80 is mounted on and secured to shaft 68 so that a prime mover, such as an electric motor, or the like (not shown), may be connected thereto in transmission relation so that the conveyer may be rotated to convey the material discharged from openings 44 and 54, through furnace 22, and off the end thereof and onto chute 82, and upon opening of discharge door 84, material such as carbonized waste can be taken therefrom and can be used in the same manner as charcoal.

The chain of conveyer 66 has upstanding sideboards 67 thereon to form a trough for carrying the material, such as carbonized waste, to the discharge door 84. It is preferable to have the chain of conveyer 66 made of relatively flat sections 67a, hinged together by pins 67b so that the conveyer chain will pass over conveyer wheels 70 and 74.

Upon the processing of the waste material, the products of combustion of furnace chamber 38 will pass around cylindrical member 26a which forms a second chamber 26, thence up through vent pipe or flue 86 and also up around the annular space between downwardly extending pipe 24 and cylindrical pipe 25, which cylindrical pipe 25 and downwardly extending pipe 24 forms an annular chamber 25a therebetween, which interconnects with annular chamber 20 which annular chamber 20 surrounds cylindrical member 14, which forms the first chamber, so that the products of combustion can pass therearound and so that the products of combustion can pass out through vent pipe or flue 88. A vent 21 is provided on the end of the furnace 22 opposite vent or flue 86, which vent has a damper 21a associated therewith, with the damper being pivotally mounted to regulate the opening of or to close the vent 21.

With the slide gates 10 and 28 closed and with the chamber 12 filled with refuse, offal, garbage, and other waste materials, and with the heat passing around cylindrical member 14, gases from the products therein will pass out through pipe 90, check valves 92, into pipe 94 to be directed into cylindrical member 95 which forms a gas receiving chamber 96. Certain of the gases will condense immediately and drop to the bottom of chamber 96 as liquids, as indicated at 98. However, the lighter gases will flow out through pipe 100 in the top of chamber 96 and will flow through condenser coil 102, thence out of the condenser coil 102 to a storage reservoir (not shown). Pipe 104, having a valve 106 thereon, is positioned near the upper end of chamber 96 so that the maximum liquid level to be maintained may be readily ascertained and the level of any fluids rising beyond this point may be drained from the chamber 96 into a storage reservoir.

A further pipe 108 is positioned a spaced distance above the bottom of chamber 96 so as to enable liquid to be drawn therethrough and through valve 110, which is used to regulate the flow from the lower end of chamber 96. A further valve 112 is positioned in the extreme lower end of chamber 96 to enable residue to be drained from chamber 96. It is preferable to have a pipe 114 connected to pipe 100 so as to enable the gas which is escaping from chamber 96 to be utilized as a fuel for use with burner 42.

A pipe 27, having a check valve 27a therein, extends between cylindrical processing chamber 26 and the lower part of chamber 96, so gas from material such as waste, garbage, etc. which is enclosed within cylindrical processing chamber 26 may pass upward therefrom to escape out through pipe 27 and check valve 27a into the liquid within chamber 96, whereupon at least part of the gases will be condensed by the contacting of the liquid 98 within chamber 96 and the remaining portion of the gases will pass out through pipe 100 near the top of chamber 96 and will pass through condenser coil 102 to condense the greater portion of the gas into liquids, and the residue gas may then be directed into gas mains or storage receivers to be used commercially for domestic heating gas and the like.

Operation

In the processing of refuse through the present apparatus, after the refuse is shredded into particles of usable size, and is directed into a compartment of the bin, the shredded refuse is directed, by conveyor 6, into the hopper 8 and, with the control gate 10 open and the slide gate 28 closed, the first cylindrical member 14, which forms a first refuse receiving chamber 12 is filled with a batch of refuse, to the desired extent, heat and the products of combustion are directed upward from burner 42 in furnace 22, in confined relation, in the lower housing 37 and in confined relation with cylindrical member 26a, in which the second refuse receiving chamber 26 is formed, and up through the annular passage 25a and flue 86 into annular passage 20, so the products of combustion will surround the cylindrical member 14 which forms the first refuse receiving chamber 12, with the products of combustion being vented through vent pipe or flue 88.

The shredded refuse in the first chamber 12 will be heated by applying heat around the greater portion of the cylindrical member 14 for a predetermined amount or length of time, with the gases therefrom passing out through pipe 90 into chamber 96, with the condensed liquids therein settling to the bottom of the chamber 96. After the shredded refuse has been heated for a predetermined length of time, so as to properly process the material, the slide gate 28 is opened, and the shredded refuse, which has been initially processed in the first refuse receiving chamber 12 within cylindrical member 14, is directed through conduit 24 into chamber 26, which is the second refuse receiving chamber. The screw conveyor 34 is rotated in a direction to urge the material toward the discharge end of cylindrical member 26a, which screw conveyor 34 is rotated a sufficient length of time to move the material away from the discharge opening of pipe 24, and with the material within cylindrical member 14 discharged into chamber 26 of cylindrical member 26a, the slide gate 28 is closed and the control gate 10 is opened, so the shredded refuse in the compartment of bin 4 will be directed through hopper 8 into the first refuse receiving chamber 12 formed by the cylindrical member 14. With the first chamber 12 in cylindrical member 14 filled, with a batch of refuse, to the desired capacity with the shredded refuse, the control gate 10 is closed, and heat from burner 42, which burner is below the second refuse receiving chamber 26, is directed into the furnace 22 to process a multiplicity of batches of refuse material simultaneously. Furthermore, the refuse may be shredded or processed and directed into the compartment of bin 4 for subsequent use. After this multiplicity of batches of shredded refuse has been processed by heat for a predetermined length of time, depending upon the temperature, the pressure and the moisture content of the material, the parti-cylindrical cap 46 is rotated until the opening 54 therein is in register with the opening 44 within the cylindrical member 26a, as shown in FIGS. 2 and 3, whereupon, the conveyor 34 is again started to urge material within the second refuse receiving chamber 26 out through openings 44 and 54. After the spiral conveyor 34 has operated a sufficient length of time or has made a sufficient number of turns, the slide gate 28 is opened, and the second batch of refuse from the first refuse receiving chamber within cylindrical member 14 is directed thereinto to urge the processed refuse out through openings 44 and 54, however, before the last batch of material, which has been introduced into chamber 26 reaches the opening 44, the parti-cylindrical cap 46 is rotated to close opening 44.

Simultaneously with the beginning of the discharge of processed refuse from chamber 26, an endless chain-type conveyor 66 is started to move in the direction indicated by the arrow in FIG. 2, so as to convey the processed material within the furnace 22, where the material may be further subjected to heat processing for carbonization thereof, so as to produce charcoal which is discharged down through chute 82 and out through gate 84.

As the material is processed in the second refuse receiving chamber 26, the gas therefrom is vented out through pipe 27 into gas receiving chamber 96, with the condensate from the gas settling, as a liquid, to the bottom of the chamber to be drained off through valve 112, with the gases passing out through pipe 100, to be further condensed in condenser 102.

Since the operations of shredding the refuse, conveying the refuse into chamber 12 within cylindrical member 14, into chamber 26 within cylindrical member 26a, and into the furnace 22, and processing these smultaneously, by heat, is treating a multiplicity of batches or refuse simultaneously.

The operations of shredding the refuse, garbage, or offal by shredder 2, directing the shredded material into a compartment in bin 4, conveying the shredded refuse from bin 4, into hopper 8, by conveyor 6, the shredded refuse will be directed into cylindrical members 14 and 26a sequentially, and further heat treating the refuse in the furnace 22, which is discharged from the cylindrical member 26a into conveyor 66, which multiplicity of operations may be carried out simultaneously, with the batches progressing in sequential order.

Having thus clearly shown and described the invention, what is claimed as new and is desired to be secured by Letters Patent is:

1. A method of reducing solid refuse into usable constituents by passing the refuse through a system which includes:
   (a) a compartment within a bin, a first refuse receiving chamber, a closeable conduit associated with said bin and leading to and being connected with said first refuse receiving chamber, a second refuse receiving chamber below said first refuse receiving chamber, a closeable conduit between said first and second refuse receiving chambers, a gas receiving chamber, a conduit in communication with the first refuse receiving chamber and the gas receiving chamber, and a further conduit in communication with the second refuse receiving chamber and the gas receiving chamber; which method comprises the steps of;
   (b) closing the closeable conduit between the first and second refuse receiving chambers;
   (c) shredding the refuse;
   (d) directing the shredded refuse into the compartment of the bin;
   (e) opening the closeable conduit leading to the first refuse receiving chamber;
   (f) discharging the refuse from the compartment in the bin into the first refuse receiving chamber to form a first batch;
   (g) closing the closeable conduit leading to the first refuse receiving chamber containing the first batch;
   (h) directing heat below the second refuse receiving chamber to heat the first batch of refuse in the first refuse receiving chamber by directing heat upward around the second refuse receiving chamber in confined relation to pass upward and around the first refuse receiving chamber in confined relation;
   (i) directing gases from the first batch of refuse in the first refuse receiving chamber, through the conduit connected therebetween, into the gas receiving chamber;
   (j) opening the closeable conduit between the first and second refuse receiving chambers, to direct the refuse of the first batch into the second refuse receiving chamber;
   (k) closing the conduit between the first and second refuse receiving chambers;
   (l) opening the closeable conduit leading to the first refuse receiving chamber, to discharge further shredded refuse from said compartment in said bin into the first refuse receiving chamber to form a second batch;
   (m) closing the closeable conduit leading to the first refuse receiving chamber containing the second batch of refuse;
   (n) directing heat below and around the second refuse receiving chamber in confined relation to heat the first batch of refuse in the second refuse receiving chamber and directing the heat from around the second refuse receiving chamber upward around the first refuse receiving chamber, which contains the second batch of refuse, in confined relation, which batches of refuse in the first and second chambers are heated simultaneously from a single source of heat for a predetermined length of time;
   (o) directing gases from the first batch of refuse in the second refuse receiving chamber, through the further conduit connected therebetween, into the gas receiving chamber,
   (p) condensing gases received in the gas receiving chamber;
   (q) withdrawing the condensate of said gases from said gas receiving chamber, and
   (r) discharging the heat processed refuse of the first batch of refuse from the second refuse receiving chamber.

2. A method of reducing solid refuse into usable constituents, by passing the refuse through the system, as defined in claim 1; and wherein
   (a) a further heat processing chamber is disposed below said second refuse receiving chamber and in communication therewith,
      (1) the further step of discharging the heat processed batch of solid material from said second chamber into said further heat processing chamber and further heating the refuse by said single source of heat, so as to carbonize the refuse material.

3. A method of reducing solid refuse into usable constituents, by passing the refuse through the system as defined in claim 1; and wherein
   (a) a further heat processing chamber is disposed below said second refuse receiving chamber and is in communication therewith,
      (1) the further step of discharging the heat processed batch of solid refuse material from said second chamber into said further heat processing chamber and further heating the refuse therein, simultaneously with the heating of the refuse in the first and second chambers, by said single source of heat so as to carbonize the refuse material, and
      (2) discharging the carbonized material from the further heat processing chamber.

4. A method of reducing solid refuse into usable constituents, by passing the refuse through the system as defined in claim 1; and wherein
   (a) a further heat processing chamber is disposed below said second refuse receiving chamber and is in communication therewith,
   (b) a movable conveyor system is positioned within said further heat processing chamber below the discharge of said second refuse receiving chamber,
      (1) the further step of discharging the heat processed batch of solid refuse material from said second chamber onto said conveyor system in said further heat processing chamber and further heating the refuse material therein, simultaneously with the heating of the refuse in the first and second chambers, by the single source of heat, so as to carbonize the refuse material in said further heat processing chamber, and (2) conveying the carbonized material within the further heat processing chamber to be discharged therefrom.

5. An apparatus for processing refuse, which apparatus comprises
(a) a refuse receiving bin,
(b) a refuse shredder mounted within said bin near the receiving end thereof,
(c) a conveyor mounted in the lower portion of said bin to receive shredded refuse from said shredder to convey said shredded refuse upward from the lower part of said bin,
(d) a refuse receiving hopper,
 (1) said conveyor being adapted to discharge refuse into said refuse receiving hopper,
(e) a first cylindrical member, forming a first refuse receiving chamber, mounted below said hopper,
(f) a first conduit connecting said hopper and said first cylindrical member,
(g) control gate means within said first conduit,
(h) a second cylindrical member forming a second refuse receiving chamber,
(i) a second conduit connecting the lower end of said first cylindrical member and the upper side of said second cylindrical member.
(j) a slide gate within said second conduit,
(k) a cylindrical member surrounding said first cylindrical member and being spaced therefrom to form an upper housing,
(l) a lower housing enclosing said second cylindrical member and being spaced therefrom,
(m) a pipe surrounding said second conduit and being spaced therefrom to form a passage therebetween to connect said lower housing and said upper housing in fluid communication for passage of heat from said lower housing to said upper housing,
(n) a burner for burning combustible material mounted in said lower housing, below said second cylindrical member, which burner produces products of combustion therein.
(o) a vent pipe connected in fluid communication with the upper housing for venting the products of combustion therefrom,
(p) said second cylindrical member having a discharge opening formed in the lower side, near an end thereof,
(q) a closure for said opening to close said second refuse chamber in said second cylindical member in substantially gas tight relation, when in one position,
(r) control means connected with said closure for moving said closure with respect to the opening in said second cylindical member,
(s) said lower housing forming a third chamber positioned below said second chamber,
(t) a conveyor, which conveyor has flat sections, mounted in said third chamber in position to receive refuse discharged from said second chamber and to convey said refuse within said third chamber to a point of discharge,
(u) a cylindrical member forming a gas receiving and condensing chamber to receive gas and to condense the gas into a liquid condensate,
 (1) which gas is separated by heat from the refuse material,
 (2) which liquid is received into the lower portion of the gas receiving and condensing chamber,
 (3) a gas discharge pipe connected to the upper portion of the first cylindrical member and to the cylindrical member forming the gas receiving and condensing chamber,
 (4) a gas discharge pipe connecting the upper portion of said second cylindrical member to the cylindrical member forming said gas receiving and condensing chamber,
(v) a condensor coil for condensing gas into a liquid,
(w) a gas discharge pipe leading from the upper portion of the cylindrical member forming the gas receiving and condensing chamber to said condenser coil and being connected thereto in fluid communication, and
(x) a valve connected to the lower end of said cylindrical member forming said gas receiving and condensing chamber for withdrawing liquid condensate from said last mentioned cylindrical member.

6. A system for processing refuse as defined in claim 5, wherein
(a) said closure for said opening in said second cylindrical member is a parti-cylindrical cap, which cap has an opening formed in a side thereof, the parti-cylindrical cap extends over an end of said second cylindrical member in which said opening is located,
(b) gaskets and seals cooperatively associated with said parti-cylindrical cap and with the end of said second cylindrical member which has the opening formed therein to form a fluid tight seal between said parti-cylindrical cap and the end of said second cylindrical member when said cap is in one position, with the opening in said parti-cylindrical cap being adapted to register with the opening in said second cylindrical member when said parti-cylindrical cap is in another position, and
(c) a screw conveyor within said second cylindrical member to urge said refuse toward said discharge opening therein.

7. A system for processing refuse as defined in claim 6, wherein
(a) clamp means associated with an end of said lower housing adjacent the end of said second cylindrical member having an opening formed therein, and
(b) said clamp means is adapted to bindingly engage said parti-cylindrical cap in fixed relation to said second cylindrical member when said clamp means is in tightly engaged relation with said parti-cylindrical cap and with said lower housing.

References Cited

UNITED STATES PATENTS

| | | | |
|---|---|---|---|
| 1,735,394 | 11/1929 | Hiller | 201—25 X |
| 1,898,326 | 2/1933 | Wahlstrom | 201—21 X |
| 2,391,566 | 12/1945 | Goodell | 201—21 X |
| 3,020,212 | 2/1962 | Lantz | 201—21 X |

FOREIGN PATENTS 869,566  11/1941  France.

JOSEPH SCOVRONEK, *Primary Examiner.*

MORRIS O. WOLK, *Examiner.*